US011486629B2

(12) United States Patent
Harikrishnasamy et al.

(10) Patent No.: US 11,486,629 B2
(45) Date of Patent: Nov. 1, 2022

(54) REFRIGERATION APPLIANCE CABINET ASSEMBLY

(71) Applicant: WHIRLPOOL CORPORATION, Benton Harbor, MI (US)

(72) Inventors: Arunkumar Harikrishnasamy, Stevensville, MI (US); Lynne F. Hunter, Dorr, MI (US); Sai B. Krishna, Pune (IN); Abhay Naik, Stevensville, MI (US); Sanket Phalak, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 229 days.

(21) Appl. No.: 16/911,654

(22) Filed: Jun. 25, 2020

(65) Prior Publication Data

US 2021/0404735 A1     Dec. 30, 2021

(51) Int. Cl.
*F25D 23/08* (2006.01)
*F25D 23/06* (2006.01)

(52) U.S. Cl.
CPC ......... *F25D 23/085* (2013.01); *F25D 23/065* (2013.01); *F25D 2201/14* (2013.01); *F25D 2323/02* (2013.01)

(58) Field of Classification Search
CPC .... F25D 23/082; F25D 23/085; F25D 23/087; F25D 23/065; F25D 23/066; F25D 23/067; F25D 2201/14
See application file for complete search history.

(56) References Cited

U.S. PATENT DOCUMENTS

| 2,330,988 | A | * | 10/1943 | Nave | F25D 23/085 220/592.08 |
| 4,170,391 | A | * | 10/1979 | Bottger | F25D 23/028 312/405 |
| 4,550,576 | A | | 11/1985 | Tate, Jr. et al. | |
| 4,706,363 | A | | 11/1987 | Taylor, Jr. | |
| 6,773,082 | B2 | | 8/2004 | Lee | |
| 7,014,283 | B2 | | 3/2006 | Grace et al. | |
| 7,108,341 | B2 | * | 9/2006 | Myers | F25D 23/066 312/352 |
| 7,194,792 | B2 | | 3/2007 | Grace et al. | |

(Continued)

FOREIGN PATENT DOCUMENTS

| EP | 2345860 A2 | 7/2011 |
| EP | 2447639 A2 | 5/2012 |

(Continued)

*Primary Examiner* — Daniel J Rohrhoff
(74) *Attorney, Agent, or Firm* — Price Heneveld LLP

(57) ABSTRACT

A cabinet assembly for a refrigerating appliance includes an inner liner having a forward liner edge. The forward liner edge defines an access opening. An outer wrapper is disposed around the inner liner and has a forward wrapper edge. The outer wrapper is spaced-apart from the inner liner to define an insulating cavity therebetween. A mullion assembly extends across the access opening. A trim breaker extends about the access opening and is coupled to the forward wrapper edge and the forward liner edge to seal the insulating cavity. The trim breaker includes a spacing flange positioned to contact the mullion assembly to define a receiving space between the trim breaker and the mullion assembly.

18 Claims, 7 Drawing Sheets

(56) References Cited

U.S. PATENT DOCUMENTS

| | | |
|---|---|---|
| 7,293,848 B2 | 11/2007 | Myers et al. |
| 8,864,253 B2 | 10/2014 | Gorz et al. |
| 8,979,224 B2 | 3/2015 | Jang et al. |
| 10,215,471 B2 | 2/2019 | Grimm et al. |
| 10,914,514 B1 * | 2/2021 | Hunter .................. F25D 23/066 |
| 2019/0101320 A1 | 4/2019 | Dherde et al. |
| 2019/0137166 A1 | 5/2019 | Dherde et al. |
| 2019/0310011 A1 * | 10/2019 | Marinello ............... F25D 27/00 |
| 2020/0141628 A1 * | 5/2020 | Krishna ................ F25D 23/066 |
| 2021/0199368 A1 * | 7/2021 | Awachat ............... F25D 23/087 |
| 2021/0207878 A1 * | 7/2021 | Deka ..................... F25D 23/085 |
| 2021/0348831 A1 * | 11/2021 | Kapure ................. E05C 19/161 |

FOREIGN PATENT DOCUMENTS

| | | | |
|---|---|---|---|
| EP | 2789949 A1 | 5/2012 | |
| EP | 3851779 A1 | 7/2021 | |
| ES | 2394419 A1 | 1/2013 | |
| GB | 853100 | 11/1960 | |
| JP | 2000266458 A | 9/2000 | |
| KR | 20070068985 A | 7/2007 | |
| KR | 20090105331 A | 10/2009 | |
| WO | 2013084584 A1 | 6/2013 | |
| WO | 2019108204 A1 | 6/2019 | |
| WO | WO-2019108204 A1 * | 6/2019 | ............ F25D 21/04 |
| WO | WO-2019226158 A1 * | 11/2019 | ........... F25D 23/028 |

\* cited by examiner

REFRIGERATION APPLIANCE CABINET ASSEMBLY

BACKGROUND OF THE DISCLOSURE

The present disclosure generally relates to a cabinet assembly for a refrigeration appliance, and more specifically, to a cabinet assembly for a refrigeration appliance including a reinforcing assembly and a trim breaker.

SUMMARY OF THE DISCLOSURE

According to one aspect of the present disclosure, a refrigerating appliance includes a cabinet assembly having an outer wrapper with opposing first and second outer sidewalls and a forward wrapper edge. The cabinet assembly further includes an inner liner having opposing first and second inner sidewalls and a forward liner edge. The forward liner edge defines an access opening, and the inner liner is positioned interior of and spaced-apart from the outer wrapper to define an insulating cavity therebetween. A mullion assembly extends across the access opening. A trim breaker extends about the access opening and includes a body portion interconnecting the first and second outer sidewalls of the outer wrapper and the first and second inner sidewalls of the inner liner, respectively. The trim breaker further includes first and second connecting flanges extending outwardly from the body portion of the trim breaker in a first direction and operably coupled to the forward liner edge and the forward wrapper edge, respectively, such that the trim breaker seals the insulating cavity. The trim breaker includes a forward spacing flange extending outwardly from the body portion of the trim breaker in a second direction that is opposed to the first direction of the first and second connecting flanges. The forward spacing flange contacts the mullion assembly and at least partially defines a receiving space between the mullion assembly and the trim breaker.

According to another aspect of the present disclosure, a refrigerating appliance includes an outer wrapper having a forward wrapper edge. An inner liner defines first and second compartments and has a forward liner edge. The forward liner edge defines an access opening in communication with the first and second compartments. The inner liner is spaced-apart from the outer wrapper to define an insulating cavity therebetween. A mullion assembly is disposed between the first and second compartments of the inner liner and extending across the access opening of the inner liner. A trim breaker extends about the access opening and seals the insulating cavity. The trim breaker includes a connecting flange coupled to one of the forward liner edge and the forward wrapper edge. The trim breaker further includes a spacing flange extending forward of the connecting flange to contact the mullion assembly and at least partially defines a receiving space between the mullion assembly and the trim breaker.

According to yet another aspect of the present disclosure, a cabinet assembly for a refrigerating appliance includes an inner liner having a forward liner edge. The forward liner edge defines an access opening. An outer wrapper is disposed around the inner liner and has a forward wrapper edge. The outer wrapper is spaced-apart from the inner liner to define an insulating cavity therebetween. A mullion assembly extends across the access opening. A trim breaker extends about the access opening and is coupled to the forward wrapper edge and the forward liner edge to seal the insulating cavity. The trim breaker includes a spacing flange positioned to contact the mullion assembly to define a receiving space between the trim breaker and the mullion assembly.

These and other features, advantages, and objects of the present disclosure will be further understood and appreciated by those skilled in the art by reference to the following specification, claims, and appended drawings.

Figure 1:
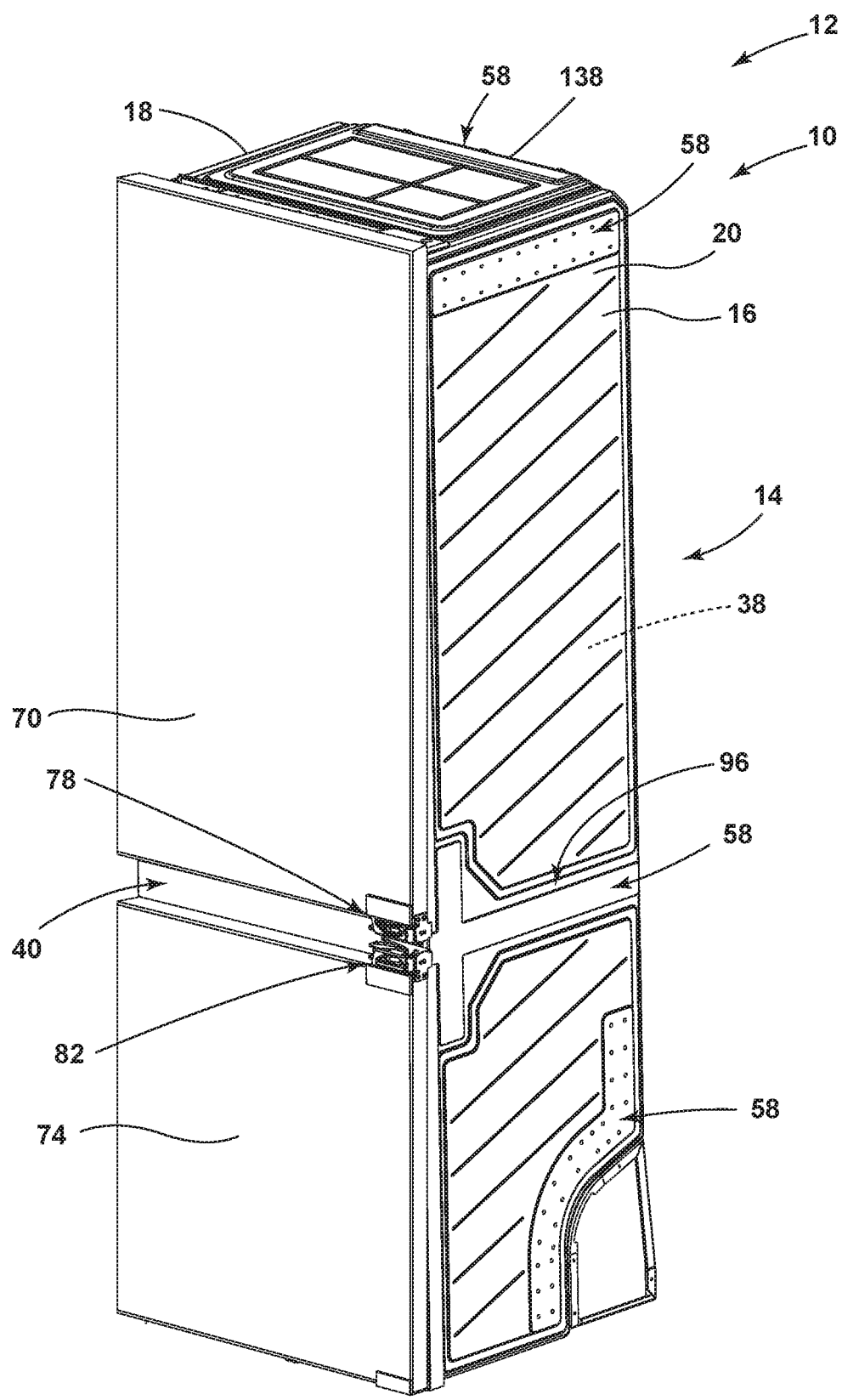
FIG. 1 is a front perspective view of an appliance, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to a trim breaker for a refrigerating appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6B, reference numeral 10 generally designates a cabinet assembly for a refrigerating appliance 12. The cabinet assembly 10 includes a cabinet 14 including an outer wrapper 16 having opposing first and second outer sidewalls 18, 20 and a forward wrapper edge 22. An inner liner 24 defines a first compartment 26 and a second compartment 28 and has first and second inner sidewalls 30, 32 and a forward liner edge 34. The forward liner edge 34 defines the access opening 36 in communication with the first and second compartments 26, 28. The inner liner 24 is positioned interior of and spaced-apart from the outer wrapper 16 to define an insulating cavity 38 therebetween. The insulating cavity 38 may be under at least a partial vacuum. A mullion assembly 40 is disposed between the first and second compartments 26, 28 and extends across the access opening 36. A trim breaker 42 extends about the access opening 36 and is operably coupled with the outer wrapper 16 and the inner liner 24. The trim breaker 42 includes a body portion 44 positioned perpendicular to the first and second outer sidewalls 18, 20 of the outer wrapper 16 and the first and second inner sidewalls 30, 32 of the inner liner 24. The body portion 44 is configured to interconnect the first and second outer sidewalls 18, 20 and the first and second inner sidewalls 30, 32, respectively. A first connecting flange 46 extends from the body portion 44 and is coupled to the forward liner edge 34, and a second connecting flange 48 extends from the body portion 44 and is coupled to the forward wrapper edge 22. The trim breaker 42 is configured to seal the insulating cavity 38. The first and second connecting flanges 46, 48 extend outwardly from the body portion 44 in a first direction, and a forward spacing flange 50 extends outwardly from the body portion 44 in a second direction that is opposite the first direction. The forward spacing flange 50 contacts the mullion assembly 40 and at least partially defines a receiving space 52 between the mullion assembly 40 and the trim breaker 42.

Figure 2:
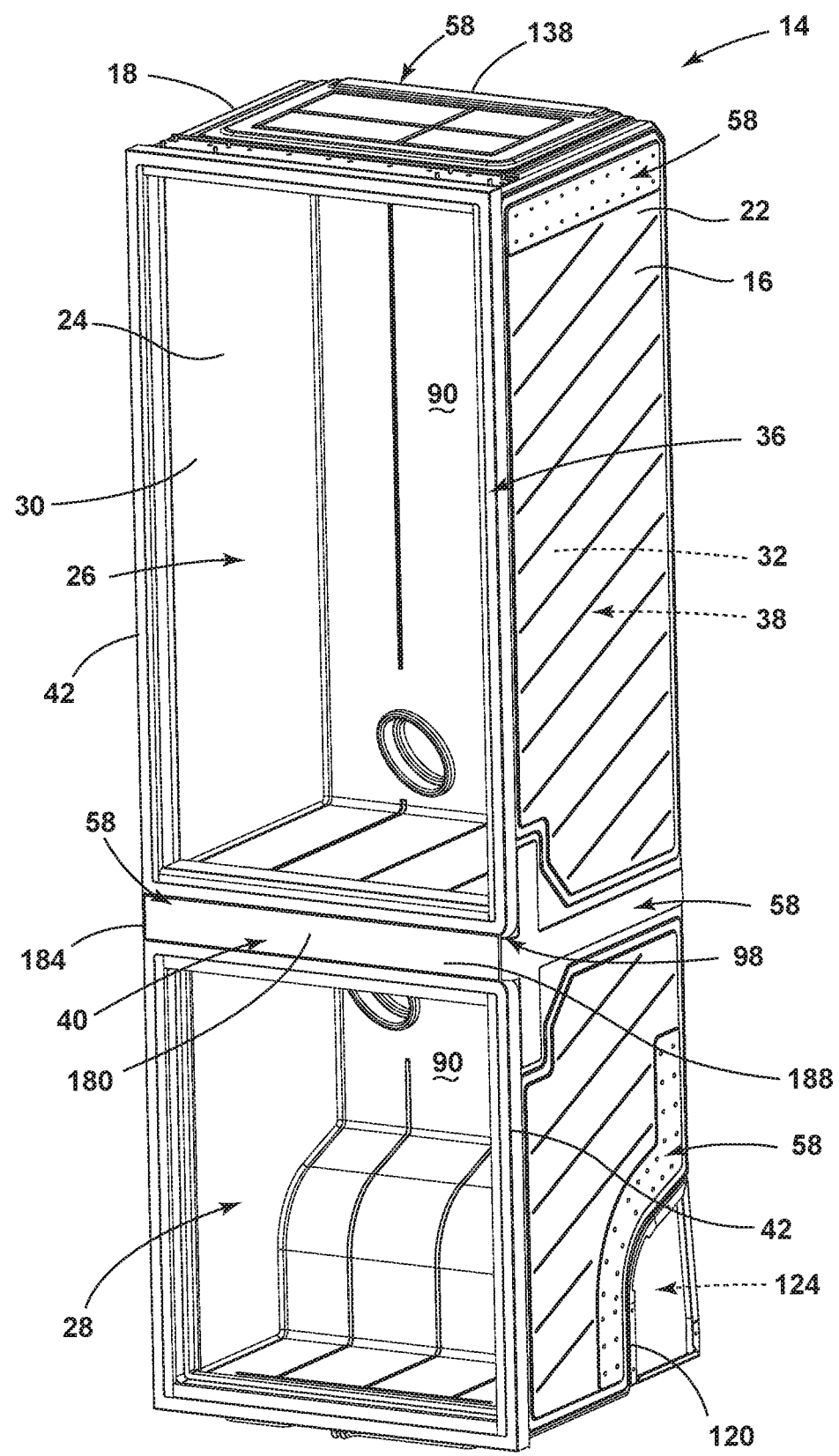
FIG. 2 is a front perspective view of the appliance of FIG. 1 shown without door assemblies, according to various examples.

Referring now to FIGS. 1 and 2, the cabinet assembly 10 is provided in an exemplary form that includes the cabinet 14, the outer wrapper 16, a first door 70 and a second door 74. As shown, the first door 70 and the second door 74 are mounted to the cabinet 14 at the mullion assembly 40 with at least a first hinge 78 and a second hinge 82, respectively. The first door 70 and the second door 74 are opened and closed to selectively cover the access opening 36 and correspond with the first and second compartments 26, 28, respectively. As illustrated, the first and second doors 70, 74 and the first and second compartments 26, 28 may be oriented as upper and lower doors and upper and lower compartments, respectively. However, it is within the scope of the disclosure for the cabinet 14 to include any suitable configuration, which may include a single door, a plurality of doors, French doors, drawers, etc. Accordingly, the inner liner 24 may include any suitable configuration of interior compartments. In some aspects, the cabinet 14 may be configured as a cabinet 14 for use in refrigerating appliance 12, such as a vacuum-insulated refrigerator. For example, in some instances, the first compartment 26 defines a refrigerated storage space, while the second compartment 28 defines a freezer storage space.

As illustrated in FIG. 2, the cabinet 14 includes the outer wrapper 16 and inner liner 24. The outer wrapper 16 can be made of a metallic material, (e.g., aluminum, steel, etc.). The inner liner 24 can be disposed or mounted within the outer wrapper 16, further defining an interior 90 of the cabinet 14. The inner liner 24 may be attached, coupled, joined, or otherwise fastened to the outer wrapper 16 via an adhesive, insulating foam, bonding agent, mechanical fastener (e.g., rivets, screws, etc.), or another comparable approach. In some aspects, the inner liner 24 includes the mullion assembly 40 or other partition that divides the inner liner 24 into the first compartment 26 and the second compartment 28. As such, the mullion assembly 40 may be disposed between the first compartment 26 and the second compartment 28 and extend across the access opening 36.

A cabinet reinforcing assembly may be coupled with the outer wrapper 16 and/or the inner liner 24. For example, as illustrated, the reinforcing assembly may include a plurality of reinforcement brackets 58 disposed on the outer wrapper 16 that provide stiffening properties to the cabinet 14 for robust quality. The plurality of reinforcement brackets 58 may include any suitable material, such as a metal (e.g., aluminum, steel, etc.), which may be welded, or otherwise fastened, to the outer wrapper 16. In some aspects, the plurality of reinforcement brackets 58 may be in the form of strips, or sheets, of steel. One of the plurality of reinforcement brackets 58 may be positioned across and/or on the mullion assembly 40, as discussed in more detail elsewhere herein.

As illustrated in FIG. 2, a trim breaker 42 may be positioned around the access opening 36. The trim breaker 42 may be constructed from polymers, plastics, or other like materials. It may be beneficial for the trim breaker 42 to be made of a material that has at least some insulative properties. Additionally, it may be beneficial for the trim breaker 42 to be made from a resilient of pliable material. The trim breaker 42 may be coupled to the outer wrapper 16 and the inner liner 24 and, as discussed in more detail elsewhere herein.

Figure 3:
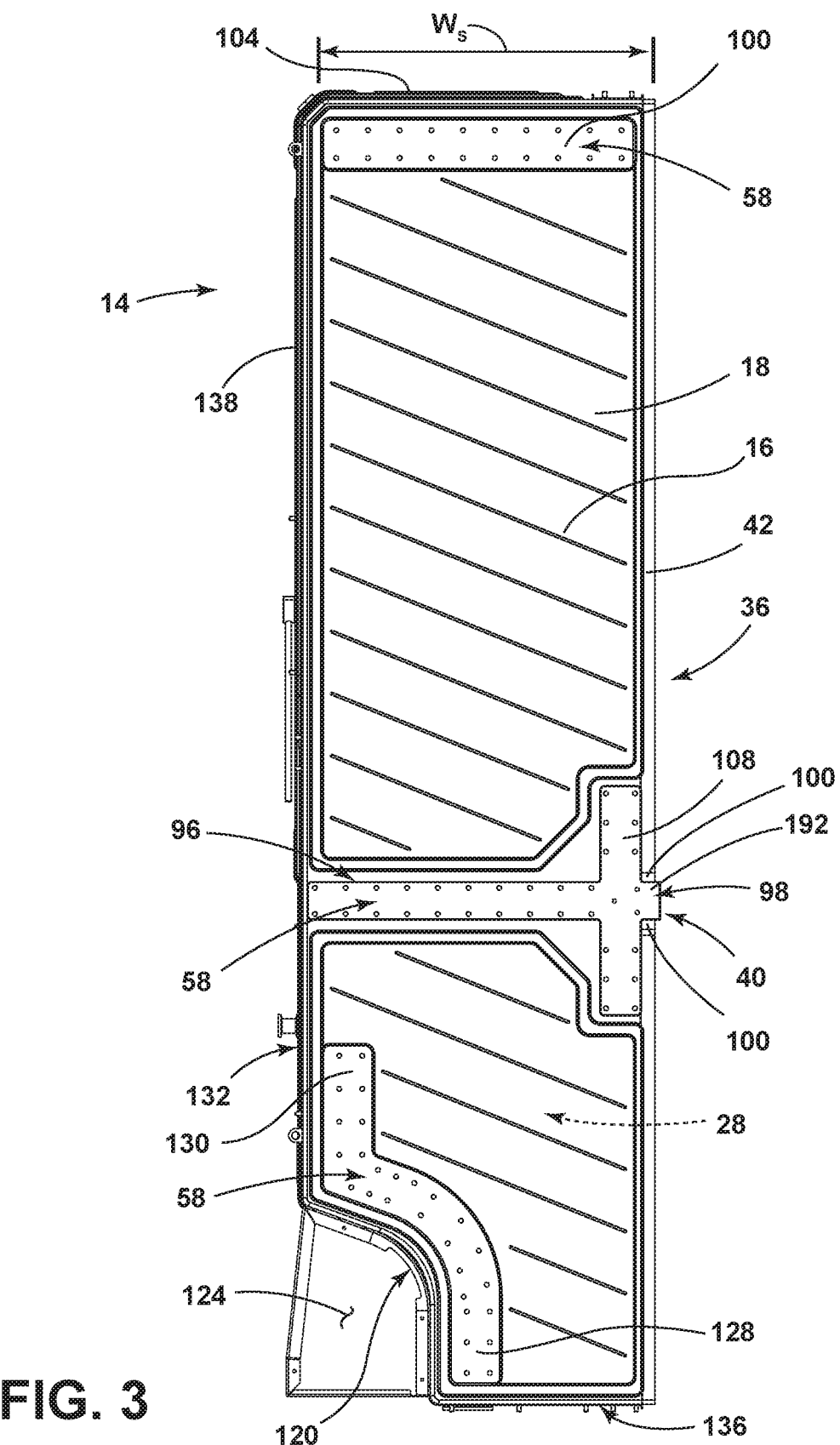
FIG. 3 is a side perspective view of the appliance of FIG. 1.

As shown, FIG. 3 is directed to the illustrative first outer sidewall 18 of the outer wrapper 16. The description with respect to the first outer sidewall 18 also applies to the second outer sidewall 20. As shown, the first outer sidewall 18 includes a width, $w_s$. One or more of plurality of reinforcement brackets 58 may include a length that is similar to, or approximately, the width, $w_s$. In this way, one or more of the plurality of reinforcement brackets 58 may extend along at least 80% or more, or 90% or more, of the width, $w_s$ of the first outer sidewall 18. Two of the illustrative reinforcement brackets 58 are vertically spaced on the first outer sidewall 18 such that longitudinal axes, $L_A$, of the respective reinforcement brackets 58 are substantially parallel with one another. As illustrated, the plurality of reinforcement brackets 58 includes an upper side section bracket 100. The upper side section bracket 100 may be positioned proximate an upper edge 104 of the first outer sidewall 18. In some examples, the upper side section bracket 100 is substantially rectangular. Additionally, the plurality of reinforcement brackets 58 may include an intermediate section bracket 108. In some examples, the intermediate section bracket 108 may have a T-shaped configuration (i.e. a T-bracket having an angled configuration between two portions of the bracket) and is positioned proximate the mullion assembly 40. As the description with respect to the first outer sidewall 18 also applies to the second outer sidewall 20, the cabinet 14 may include first and second upper side section brackets 100 and first and second intermediate section brackets 108 disposed on first and second outer sidewalls 18, 20, respectively.

Still referring to FIG. 3 illustrating the first outer sidewall 18, the outer sidewall 18 may include a curved lower edge 120 configured to accommodate a machine compartment 124 thereunder. One of the plurality of reinforcement brackets 58 may include a lower curved section 128 and an upper linear section 130, which may be vertically spaced from the upper side section bracket 100 and the intermediate section bracket 108. The lower curved section 128 may define a nonlinear configuration. As illustrated, the curved section 128 extends along the curved lower edge 120. In some aspects, the upper linear section 130 extends vertically along a rear edge 132 of the first outer sidewall 18 and the lower curved section 128 curves along the curved lower edge 120 towards a bottom edge 136 of the first outer sidewall 18. As the description with respect to the first outer sidewall 18 also applies to the second outer sidewall 20, the cabinet 14 may include first and second reinforcement brackets 58 that extend along the curved lower edge 120 of the first and second outer sidewalls 18, 20.

Figure 4:
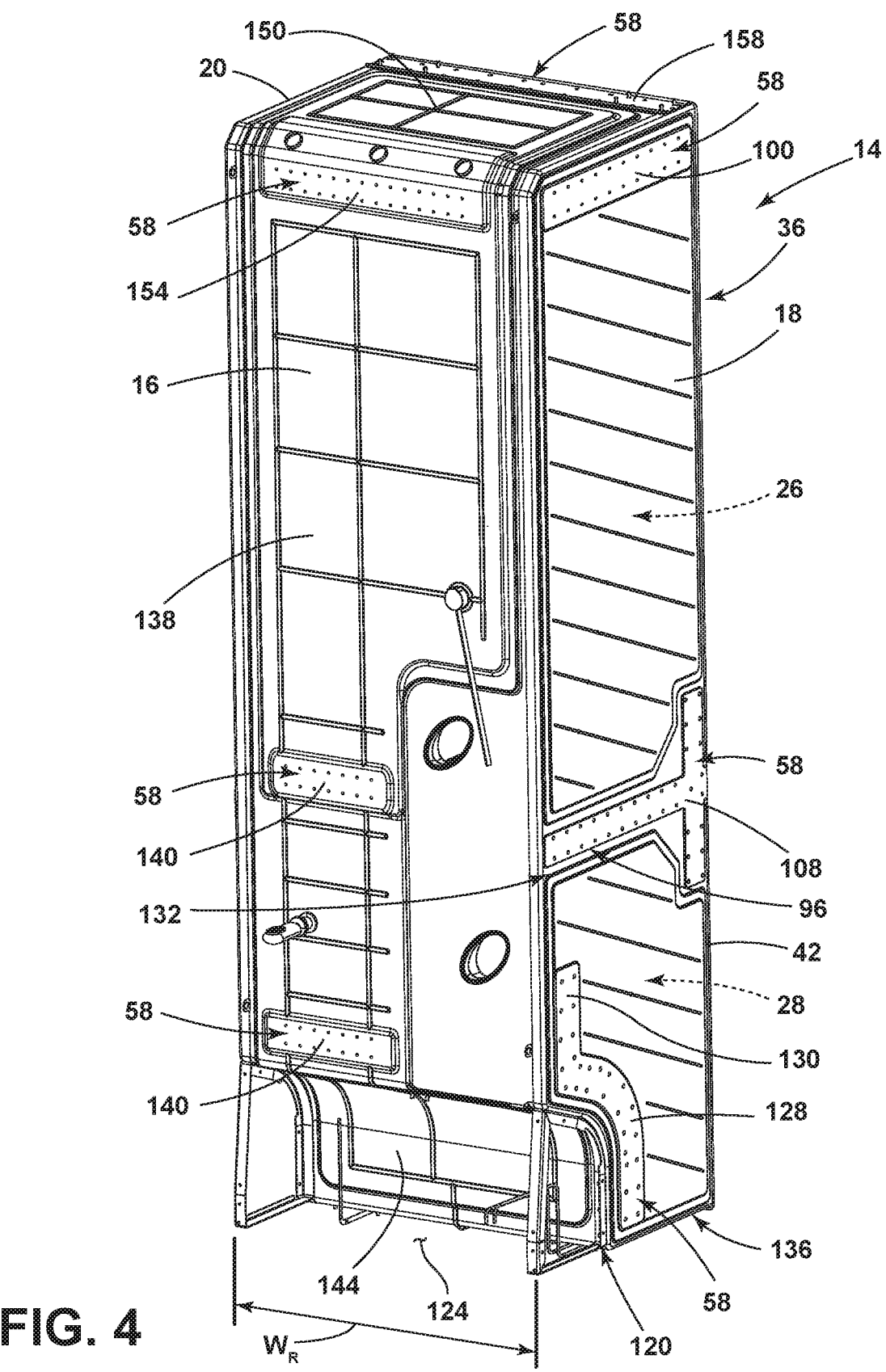
FIG. 4 is a rear perspective view of the appliance of FIG. 1.

Referring now to FIG. 4, a rear wall 138 of the cabinet 14 may include one or more of the plurality of reinforcement brackets 58. As shown, the rear wall 138 includes a width, $w_R$. In some aspects, a pair of vertically spaced and substantially parallel rear reinforcement brackets 140 are disposed on the rear wall 138. The rear reinforcement brackets 140 may be substantially rectangular and may extend along a portion of the width, $w_R$. It is contemplated that the rear reinforcement brackets 140 extend along at least 80% or more of the width, $w_R$, or along less than 80% of the width, $w_R$. At least one of the rear reinforcement brackets 140 may be positioned proximate a curved lower portion 144 of the rear wall 138, which is configured to accommodate the machine compartment 124.

As illustrated in FIG. 4, the cabinet 14 further includes a top wall 150. The top wall 150 couples the first and second outer sidewalls 18, 20 and the rear wall 138 at an upper end of the cabinet 14. As shown, the upper side section bracket 100 is positioned proximate the top wall 150. In some examples, at least one reinforcement bracket 58 is defined as a top, or upper, reinforcement bracket 154 that is operably coupled to the rear wall 138 and the top wall 150. The illustrative top reinforcement bracket 154 includes a generally curved configuration that may wrap around at least a portion of the upper corner of the appliance 12, but is not limited to such. It is also contemplated that the top reinforcement bracket 154 may include a generally 90° angle to accommodate the edge between the top wall 150 and the rear wall 138. Furthermore, at least one of the plurality of reinforcement brackets 58 may include a second top, or upper, reinforcement bracket 158 operably coupled to the top wall 150 proximate the access opening 36. The first and second top reinforcement brackets 154, 158 may include lengths of at least 80% or more of the width, $w_R$, which is generally the same width as the top wall 150.

Figure 5:
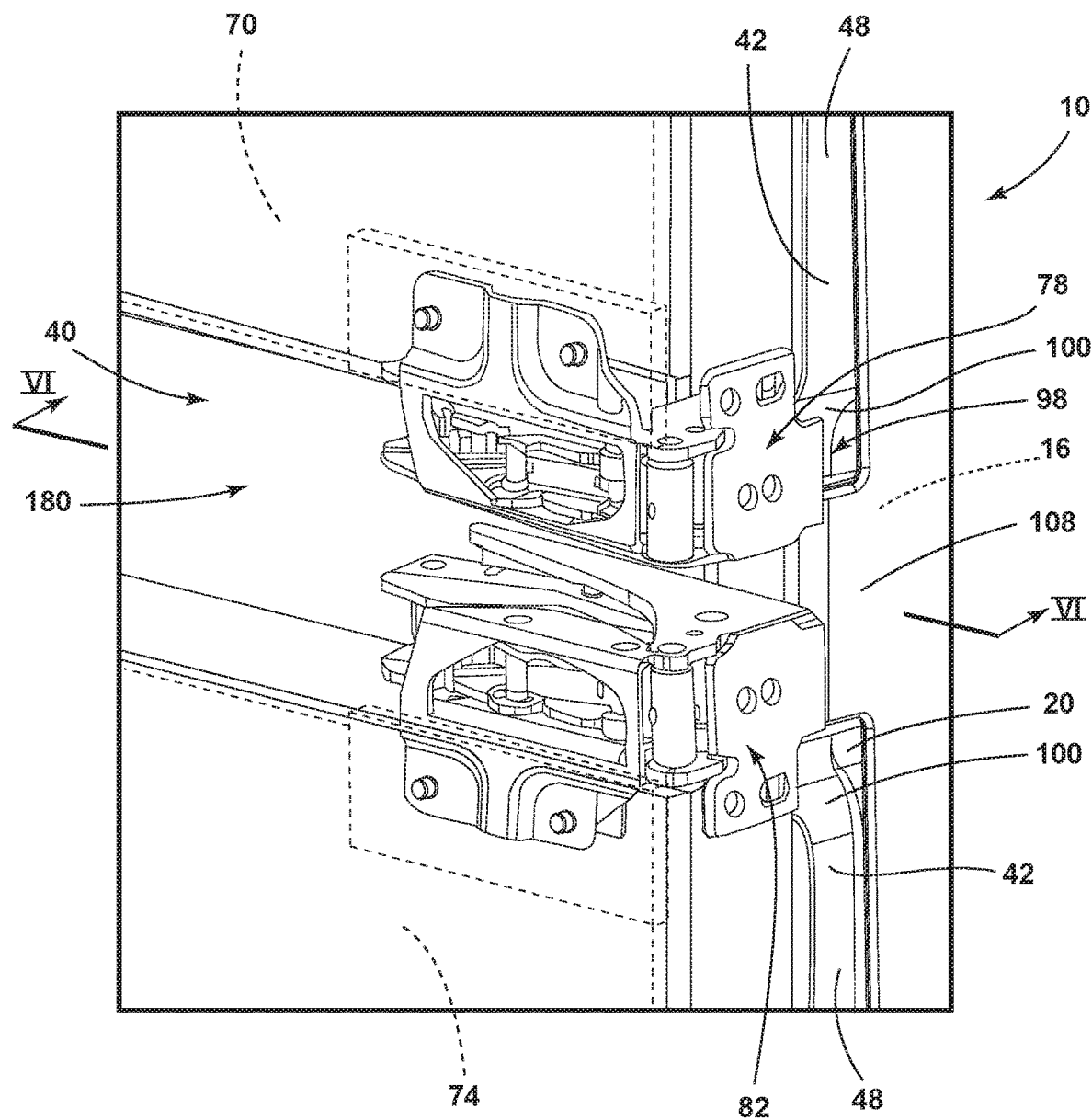
FIG. 5 is an enlarged side perspective view of hinge assemblies of the appliance of FIG. 1.
Figure 6A:
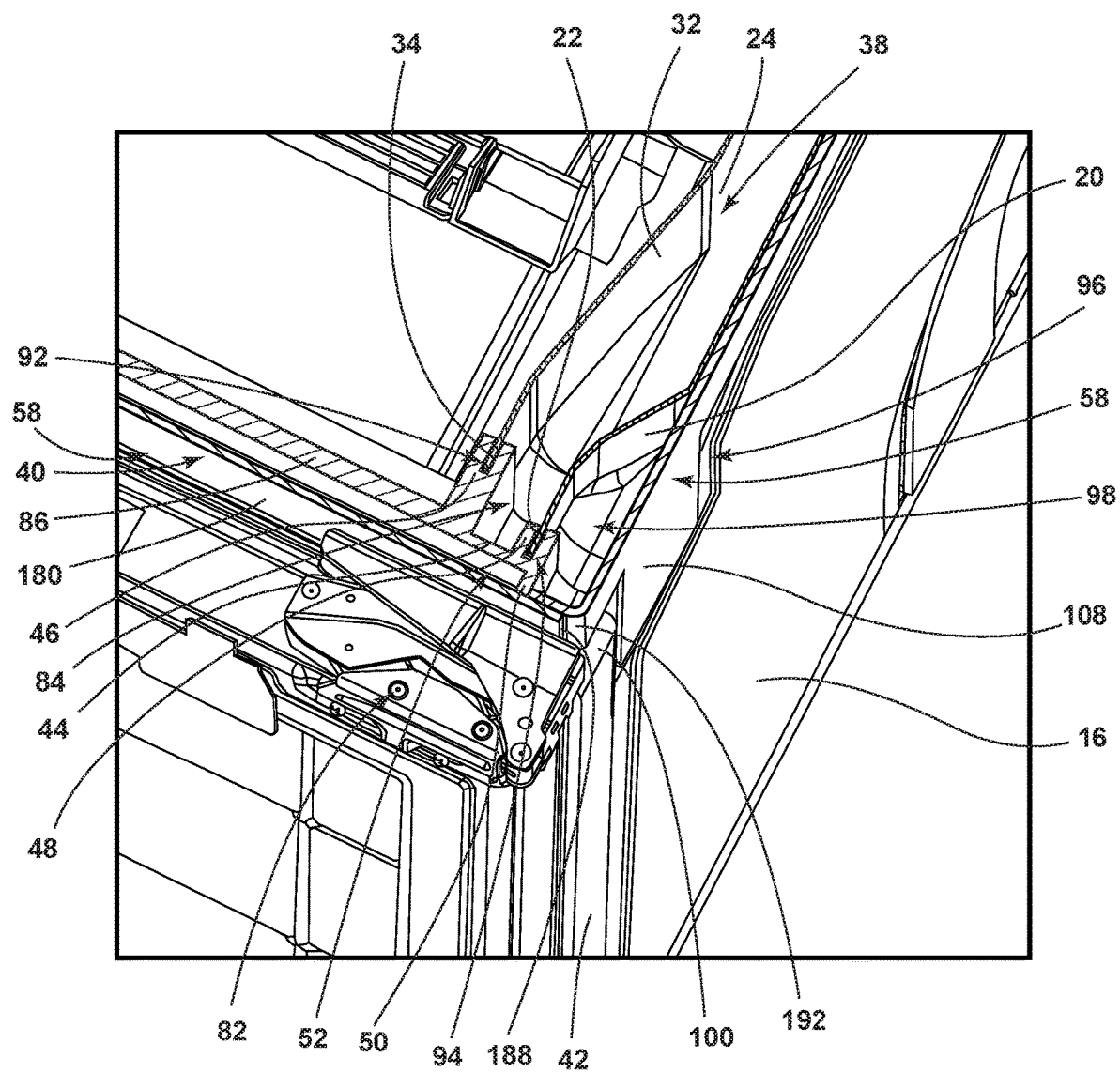
FIG. 6A an enlarged cross-sectional view taken along line VI-VI of FIG. 3 to illustrate a trim breaker, according to various examples.
Figure 6B:
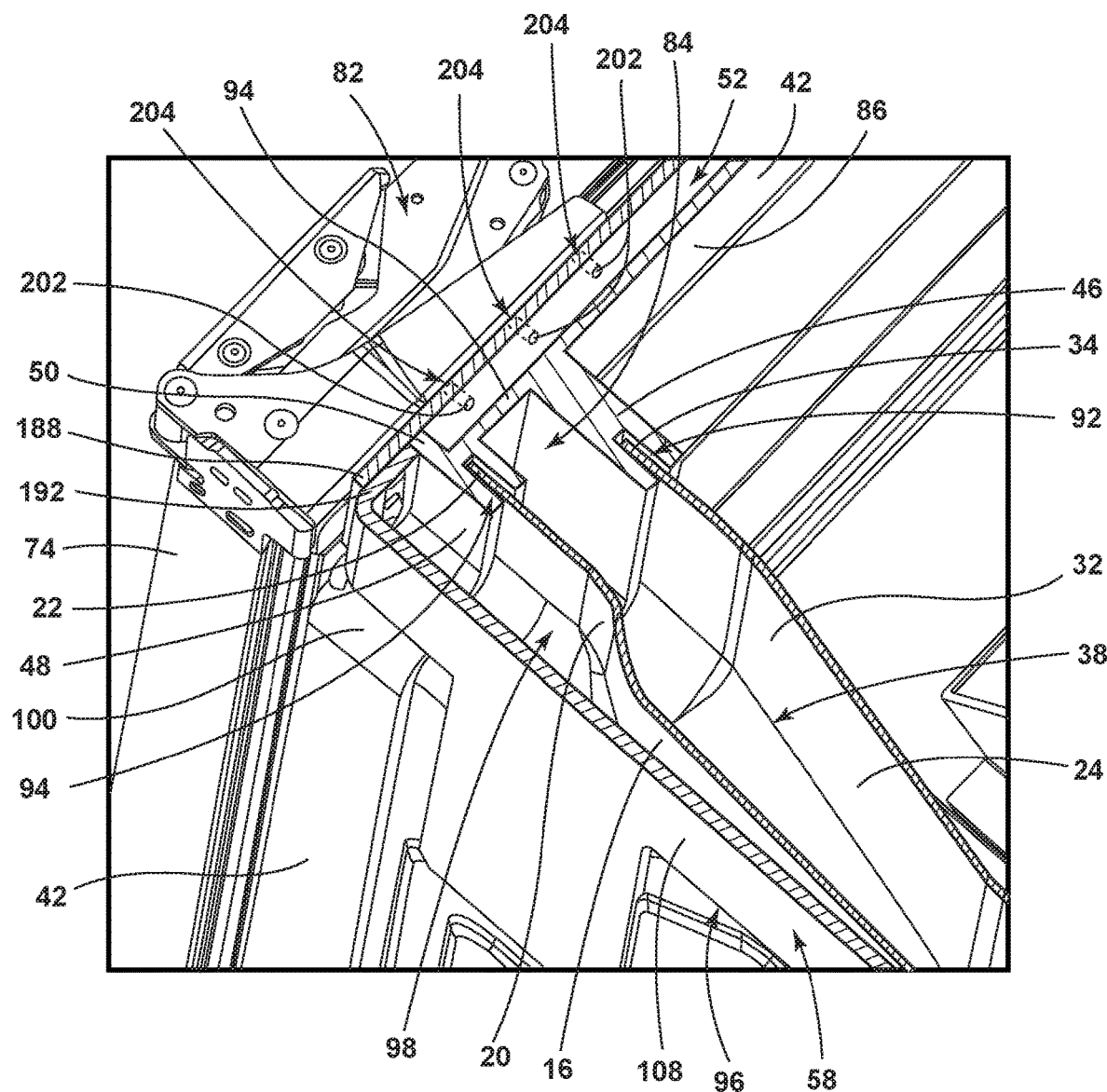
FIG. 6B is a rear perspective view of the cross-section of FIG. 6A.

Referring now to FIGS. 5-6B, an enlarged view of the cabinet 14 is illustrated proximate the hinges 78, 82 of the first and second doors 70, 74. While the trim breaker 42 is illustrated and described with respect to a position proximate the second outer sidewall 20, it will be understood that a similar and/or symmetric arrangement of brackets 58 and the trim breaker 42 may be positioned proximate the first outer sidewall 18.

As best illustrated in FIGS. 6A and 6B, the trim breaker 42 is coupled with the inner liner 24 and the outer wrapper 16. As previously introduced, the inner liner 24 is spaced-apart from the outer wrapper 16 to define the insulating cavity 38. The forward wrapper edge 22 of the outer wrapper 16 and the forward liner edge 34 of the inner liner 24 may define a forward opening 84 in communication with the insulating cavity 38. The trim breaker 42 is configured to cover the forward opening 84 to seal the insulating cavity 38 defined between the outer wrapper 16 and the inner liner 24 and to form an insulation structure, which can be substantially air-tight. In some examples, the insulating cavity 38 defines a sealed space or gap between the outer wrapper 16 and the inner liner 24, which can be evacuated such that a pressure within the insulating cavity 38 is less than a pressure outside of the cabinet 14 and/or within the interior 90. The insulating cavity 38 may be evacuated until a pressure of about 1 mbar (0.1 kPa) is reached. In such examples, the insulation structure may be referred to as a vacuum-insulated structure. The term vacuum-insulated structure is not intended to refer to an absolute vacuum. Rather, the term vacuum-insulated structure is intended to refer to a structure that has an internal pressure that is below atmospheric pressure. For example, the sealed insulating cavity 38 may be under vacuum and less than about 50 kPa, less than about 20 kPa, less than about 5 kPa, greater than 0 kPa and/or combinations of ranges thereof. In various examples, the insulating cavity 38 is filled with an insulative material (e.g. foam, beads, etc.) prior to the evacuation of the space or gap. Optionally, the insulating cavity 38 may be filled with the insulative material rather than evacuating the space or gap. In other words, the insulating cavity 38 may be configured to be in at least a partial vacuum sealed state when the insulating cavity 38 is evacuated.

As best shown in FIGS. 6A and 6B, the trim breaker 42 includes the body portion 44 extending along at least a portion of the periphery of the access opening 36 of the cabinet 14 (FIG. 2). The body portion 44 is positioned substantially perpendicular to the forward wrapper edge 22 and the forward liner edge 34 and may have any width configured to cover the forward opening 84. First and second connecting flanges 46, 48 extend substantially perpendicularly from the body portion 44 and rearward toward the forward opening 84.

The first connecting flange 46 is positioned interior of the second connecting flange 48 and may extend a greater distance from the body portion 44 of the trim breaker 42 than the second connecting flange 48. The first connecting flange 46 defines a first slot 92 configured to receive the forward liner edge 34. The forward liner edge 34 may be retained in the first slot 92 using, for example, an adhesive or fastener, or may be coupled by any other method with the first connecting flange 46 to couple the trim breaker 42 with the inner liner 24.

The second connecting flange 48 is positioned exterior of and spaced-apart from the first connecting flange 46. The second connecting flange 48 defines a second slot 94 configured to receive the forward wrapper edge 22. The second connecting flange 48 may be spaced from the first connecting flange 46 to align with the forward wrapper edge 22. Alternatively, the second connecting flange 48 may be pliable to couple with the forward wrapper edge 22 or the outer wrapper 16 may be movable to couple with the second connecting flange 48. The forward wrapper edge 22 may be retained in the second slot 94 using, for example, an adhesive or fastener, or may be coupled by any other method with the second connecting flange 48 to couple the trim breaker 42 with the outer wrapper 16.

The trim breaker 42 may further include the spacing flange 50 extending opposite the first and second connecting flanges 46, 48 forward of the cabinet assembly 10. The spacing flange 50 may be substantially aligned with one of the first and second connecting flanges 46, 48 or the spacing flange 50 may be oriented between the first and second connecting flanges 46, 48. It will be understood that, while the first and second connecting flanges 46, 48 and the spacing flange 50 are illustrated proximate the second outer sidewall 20 of the outer wrapper 16, the trim breaker 42 may include a set of flanges 46, 48, 50 proximate the first outer sidewall 18 on an opposing side of a mullion portion 86 of the trim breaker 42 and oriented to be symmetric with the flanges 46, 48, 50 proximate the second outer sidewall 20, as described, without departing from the scope of the present disclosure. The mullion portion 86 of the trim breaker 42 may extend along a part of the mullion assembly 40 or the entirety of the mullion assembly 40 without departing from the scope of the present disclosure. In other words, each of the flanges 46, 48, 50 may be one of a pair of flanges disposed on opposing sides of the appliance 12 and spaced-apart by a mullion portion 86 of the trim breaker 42.

Referring now to FIGS. 3-5, the first and second outer sidewalls 18, 20, the rear wall 138, and/or the top wall 150 of the outer wrapper 16 may be configured as a singular piece. As illustrated, the outer wrapper 16 may include grooves, or recessed portions 96, configured to receive one or more of the plurality of reinforcement brackets 58. The recessed portions 96 may be disposed along any portion of the outer wrapper 16 and inwardly extend from the outer surface of the outer wrapper 16. The recessed portions 96 are dimensioned such that the corresponding reinforcement bracket 58 is closely received within the recessed portions 96. Accordingly, the recessed portions 96 may include shapes generally similar to the shapes of the corresponding reinforcement bracket 58.

As illustrated in FIGS. 5-6B, with reference to the second outer sidewall 20, the sidewall 20 may include a recessed portion 96 for one of the intermediate section brackets 108 of the plurality of reinforcement brackets 58. The recessed portion 96 may be in communication with a forward recess 98 positioned proximate the forward wrapper edge 22 of the outer wrapper 16. The forward recess 98 may be recessed further inward of the outer wrapper 16 than the recessed portion 96 and may extend the height of the cabinet assembly 10 or may be defined proximate the mullion assembly 40. The trim breaker 42 may be shaped to complement the outer wrapper 16 and the forward recess 98 as it extends along the forward wrapper edge 22 of the outer wrapper 16. For example, as illustrated, the trim breaker 42 may include a curved portion shaped to extend along the outer sidewall 20 where the outer sidewall 20 defines the forward recess 98.

As illustrated in FIG. 2 and FIGS. 5-6B, a mounting plate, or mullion brace 180, may be positioned at the mullion assembly 40 and may extend across a portion or all of the mullion assembly 40. The mounting plate 180 includes first and second transverse ends 184, 188, which are positioned proximate the first and second outer sidewalls 18, 20, respectively, when assembled. Accordingly, the first and second transverse ends 184, 188 may be in the form of engagement portions, which may be coupled with respective intermediate section brackets 108 positioned on the first and second outer sidewalls 18, 20 of the outer wrapper 16.

As previously discussed, the intermediate section brackets 108 of the plurality of reinforcement brackets 58 may include a T-shaped construction thereby defining a T-bracket. Each of the T-bracket intermediate section brackets 108 may include a forward corner 192 configured to extend perpendicularly from the bracket 108 toward the center of the mullion assembly 40. Each forward corner 192 is configured to align with and/or at least partially conceal or enclose the respective forward recess 98 defined in communication with the respective recessed portion 96. In various examples, the forward corner 192 may at least partially contact one or both of the second connecting flange 48 and the spacing flange 50. In other examples, each forward corner 192 may be positioned to contact any portion of the trim breaker 42 or may be spaced-apart from the trim breaker 42.

As best shown in FIGS. 6A and 6B, the first and second transverse ends 184, 188 may be positioned to overlap with and/or are coupled with the forward corner 192 of one of the intermediate section brackets 108. In other words, the forward corner 192 of each of the intermediate section brackets 108 may be at least partially overlapped by the first and second transverse ends 184, 188 of the mounting plate 180. The mounting plate 180 may be coupled with the intermediate section brackets 108 using fasteners, adhesive, welding, or any other coupling method without departing from the scope of the present disclosure.

Referring still to FIGS. 6A and 6B, the spacing flange 50 of the trim breaker 42 is positioned to contact the mounting plate 180. The spacing flange 50 is configured to space the mounting plate 180 away from the mullion portion 86 of the trim breaker 42 to define the receiving space 52 therebetween. The receiving space 52 may extend along a portion of the mullion assembly 40 or may extend the length of the mullion assembly 40. When the insulating cavity 38 is sealed by the trim breaker 42, the receiving space 52 is defined forward of and separate from the insulating cavity 38.

As illustrated with regard to the second hinge 82, the first and second hinges 78, 82 may be coupled with the mounting plate 180 by a plurality of fasteners 202 extending through the bracket 180 and into the receiving space 52. In various examples, the mounting plate 180 may define a plurality of through-holes 204 configured to receive the plurality of fasteners 202. While only the second hinge 82 is illustrated, it will be understood that both the first and second hinges 78, 82 may be coupled with the mounting plate 180 by one or more of the plurality of fasteners 202. It will further be understood that the plurality of fasteners 202 may extend through the mounting plate 180 into the receiving space 52, through the mounting plate 180 and the forward corner 192 of the respective intermediate section bracket 108 into the forward recess 98, and/or any combination thereof. The fasteners 202 may be screws, bolts, or any other fastener configured to be received by the plurality of through-holes to couple the respective hinge 78, 82 with the mounting plate 180. The extension of the fasteners 202 into the receiving space 52 and/or the forward recess 98 is configured to prevent puncture and/or damage to the insulting cavity 38. In other words, the trim breaker 42 may be jogged to provide space to mount the first and second hinges 78, 82. Thus, the first and second hinges 78, 82 can be positioned exterior of the cabinet 14 without puncturing and/or affecting the seal of the insulating cavity 38.

According to one aspect, a refrigerating appliance may include a cabinet assembly having an outer wrapper with opposing first and second outer sidewalls and a forward wrapper edge. The cabinet assembly may further include an inner liner having opposing first and second inner sidewalls and a forward liner edge. The forward liner edge may define an access opening, and the inner liner is positioned interior of and spaced-apart from the outer wrapper to define an insulating cavity therebetween. A mullion assembly may extend across the access opening. A trim breaker may extend about the access opening and may include a body portion interconnecting the first and second outer sidewalls of the outer wrapper and the first and second inner sidewalls of the inner liner, respectively. The trim breaker may further include first and second connecting flanges extending outwardly from the body portion of the trim breaker in a first direction and operably coupled to the forward liner edge and the forward wrapper edge, respectively, such that the trim breaker seals the insulating cavity. The trim breaker may include a forward spacing flange extending outwardly from the body portion of the trim breaker in a second direction that is opposed to the first direction of the first and second connecting flanges. The forward spacing flange may contact the mullion assembly and at least partially defines a receiving space between the mullion assembly and the trim breaker.

According to another aspect, a refrigerating appliance may include a door hingedly coupled to a cabinet assembly by at least one hinge. The at least one hinge may be operably coupled to a mullion assembly by a plurality of fasteners.

According to another aspect, a mullion assembly may include a mounting plate configured to support a hinge and extending at least partially along the mullion assembly.

According to another aspect, a plurality of fasteners may be at least partially received by a receiving space.

According to another aspect, an outer wrapper may include a recessed portion disposed on one of opposing first and second outer sidewalls of an outer wrapper.

According to another aspect, a refrigerating appliance may include a bracket disposed at least partially along a mullion assembly. The bracket may be received within a recessed portion of an outer wrapper.

According to another aspect, a forward spacing flange may define a first forward spacing flange positioned proximate a first outer sidewall. A trim breaker may include a second forward spacing flange positioned proximate a second outer sidewall.

According to another aspect, an insulating cavity may be an airtight cavity having an internal pressure of less than 50 kPa.

According to another aspect, a refrigerating appliance may include an outer wrapper having a forward wrapper edge. An inner liner may define first and second compartments and may have a forward liner edge. The forward liner edge may define an access opening in communication with the first and second compartments. The inner liner may be spaced-apart from the outer wrapper to define an insulating cavity therebetween. A mullion assembly may be disposed between the first and second compartments of the inner liner and extending across the access opening of the inner liner. A trim breaker may extend about the access opening and seals the insulating cavity. The trim breaker may include a connecting flange coupled to one of the forward liner edge and the forward wrapper edge. The trim breaker may further include a spacing flange extending forward of the connecting flange to contact the mullion assembly and may at least partially define a receiving space between the mullion assembly and the trim breaker.

According to another aspect, an outer wrapper may include a recessed portion in communication with a forward recess.

According to another aspect, a refrigerating appliance may include a reinforcement bracket coupled with an outer wrapper and having a forward corner. The reinforcement bracket may be received in a recessed portion.

According to another aspect, a forward corner of a reinforcement bracket may abut a spacing flange and may at least partially conceal a forward recess.

According to another aspect, a mullion assembly may include a mounting plate operably coupled with a forward corner of a reinforcement bracket.

According to another aspect, a cabinet assembly for a refrigerating appliance may include an inner liner having a forward liner edge. The forward liner edge may define an access opening. An outer wrapper may be disposed around the inner liner and may have a forward wrapper edge. The outer wrapper may be spaced-apart from the inner liner to define an insulating cavity therebetween. A mullion assembly may extend across the access opening. A trim breaker may extend about the access opening and may be coupled to the forward wrapper edge and the forward liner edge to seal the insulating cavity. The trim breaker may include a spacing flange positioned to contact the mullion assembly to define a receiving space between the trim breaker and the mullion assembly.

According to another aspect, an insulating cavity may be in communication with a forward opening defined by a forward wrapper edge and a forward liner edge.

According to another aspect, a trim breaker may include a body portion positioned to cover a forward opening and seal an insulating cavity. The trim breaker may include first and second connecting flanges extending outwardly from the body portion. The first connecting flange may be coupled to a forward liner edge and the second connecting flange may be coupled to a forward wrapper edge.

According to another aspect, a spacing flange may extend in an opposed configuration relative to first and second connecting flanges.

According to another aspect, a mullion assembly may include a mounting plate extending at least partially along the mullion assembly. The mounting plate may contact a spacing flange.

According to another aspect, a spacing flange may be one of a pair of spacing flanges positioned on opposing ends of a mullion assembly.

According to another aspect, a cabinet assembly may include a door configured to at least partially seal an access opening. The door may be operably coupled with a mullion assembly by a hinge. The hinge may be operably coupled with the mullion assembly by a plurality of fasteners extending at least partially into a receiving space.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A refrigerating appliance, comprising:
   a cabinet assembly having an outer wrapper with opposing first and second outer sidewalls and a forward wrapper edge, wherein the cabinet assembly further includes an inner liner having opposing first and second inner sidewalls and a forward liner edge, wherein the forward liner edge defines an access opening, and further wherein the inner liner is positioned interior of and spaced-apart from the outer wrapper to define an insulating cavity therebetween;
   a mullion assembly extending across the access opening; and
   a trim breaker extending about the access opening, wherein the trim breaker includes a body portion interconnecting the first and second outer sidewalls of the outer wrapper and the first and second inner sidewalls of the inner liner, respectively, and wherein the trim breaker further includes first and second connecting flanges extending outwardly from the body portion of the trim breaker in a first direction and operably coupled to the forward liner edge and the forward wrapper edge, respectively, such that the trim breaker seals the insulating cavity, and further wherein the trim breaker includes a forward spacing flange extending outwardly from the body portion of the trim breaker in a second direction that is opposed to the first direction of the first and second connecting flanges, and further wherein the forward spacing flange contacts the mullion assembly and at least partially defines a receiving space between the mullion assembly and the trim breaker.

2. The refrigerating appliance of claim 1, further comprising:
   a door hingedly coupled to the cabinet assembly by at least one hinge, wherein the at least one hinge is operably coupled to the mullion assembly by a plurality of fasteners.

3. The refrigerating appliance of claim 2, wherein the mullion assembly includes a mounting plate configured to support the hinge and extending at least partially along the mullion assembly.

4. The refrigerating appliance of claim 2, wherein the plurality of fasteners are at least partially received by the receiving space.

5. The refrigerating appliance of claim 1, wherein the outer wrapper includes a recessed portion disposed on one of the opposing first and second outer sidewalls of the outer wrapper.

6. The refrigerating appliance of claim 5, including:
   a bracket disposed at least partially along the mullion assembly, wherein the bracket is received within the recessed portion of the outer wrapper.

7. The refrigerating appliance of claim 1, wherein the forward spacing flange defines a first forward spacing flange positioned proximate the first outer sidewall, and further wherein the trim breaker includes a second forward spacing flange positioned proximate the second outer sidewall.

8. The refrigerating appliance of claim 1, wherein the insulating cavity is an airtight cavity having an internal pressure of less than 50 kPa.

9. A refrigerating appliance, comprising:
   an outer wrapper having a forward wrapper edge, wherein the outer wrapper includes a recessed portion in communication with a forward recess;
   an inner liner defining first and second compartments and having a forward liner edge, wherein the forward liner edge defines an access opening in communication with the first and second compartments, and further wherein the inner liner is spaced-apart from the outer wrapper to define an insulating cavity therebetween;
   a mullion assembly disposed between the first and second compartments of the inner liner and extending across the access opening of the inner liner; and
   a trim breaker extending about the access opening and sealing the insulating cavity, wherein the trim breaker includes a connecting flange coupled to one of the forward liner edge and the forward wrapper edge, wherein the trim breaker further includes a spacing flange extending forward of the connecting flange to contact the mullion assembly and at least partially defines a receiving space between the mullion assembly and the trim breaker.

10. The refrigerating appliance of claim 9, including:
    a reinforcement bracket coupled with the outer wrapper and having a forward corner, wherein the reinforcement bracket is received in the recessed portion.

11. The refrigerating appliance of claim 10, wherein the forward corner of the reinforcement bracket abuts the spacing flange and at least partially conceals the forward recess.

12. The refrigerating appliance of claim 10, wherein the mullion assembly includes a mounting plate operably coupled with the forward corner of the reinforcement bracket.

13. A cabinet assembly for a refrigerating appliance, comprising:
    an inner liner having a forward liner edge, wherein the forward liner edge defines an access opening;
    an outer wrapper disposed around the inner liner and having a forward wrapper edge, wherein the outer wrapper is spaced-apart from the inner liner to define an insulating cavity therebetween;

a mullion assembly extending across the access opening, wherein the mullion assembly includes a mounting plate extending at least partially along the mullion assembly; and a trim breaker extending about the access opening and coupled to the forward wrapper edge and the forward liner edge to seal the insulating cavity, wherein the trim breaker includes a spacing flange positioned to contact the mullion assembly to define a receiving space between the trim breaker and the mullion assembly, and further wherein the mounting plate contacts the spacing flange.

14. The cabinet assembly of claim 13, wherein the insulating cavity is in communication with a forward opening defined by the forward wrapper edge and the forward liner edge.

15. The cabinet assembly of claim 14, wherein the trim breaker includes a body portion positioned to cover the forward opening and seal the insulating cavity, wherein the trim breaker includes first and second connecting flanges extending outwardly from the body portion, and further wherein the first connecting flange is coupled to the forward liner edge and the second connecting flange is coupled to the forward wrapper edge.

16. The cabinet assembly of claim 15, wherein the spacing flange extends in an opposed configuration relative to the first and second connecting flanges.

17. The cabinet assembly of claim 13, wherein the spacing flange is one of a pair of spacing flanges positioned on opposing ends of the mullion assembly.

18. The cabinet assembly of claim 13, wherein the cabinet assembly further includes a door configured to at least partially seal the access opening, wherein the door is operably coupled with the mullion assembly by a hinge, and further wherein the hinge is operably coupled with the mullion assembly by a plurality of fasteners extending at least partially into the receiving space.

* * * * *